United States Patent [19]
Cohen

[11] Patent Number: 5,829,685
[45] Date of Patent: Nov. 3, 1998

[54] REGULATED FLOW-RESTRICTOR DEVICES PARTICULARLY USEFUL IN DRIP IRRIGATION

[76] Inventor: Amir Cohen, Yuvalim, 20 142, Doar Na Gush Segev, Israel

[21] Appl. No.: 805,416

[22] Filed: Feb. 26, 1997

[30] Foreign Application Priority Data

Mar. 1, 1996 [IL] Israel .......................................... 117326

[51] Int. Cl.⁶ ....................................................... B05B 1/02
[52] U.S. Cl. ......................... 239/533.1; 239/542; 239/547
[58] Field of Search ................................ 239/107, 533.1, 239/533.13, 542, 547, 566, 567

[56] References Cited

U.S. PATENT DOCUMENTS

| | | | |
|---|---|---|---|
| 5,183,208 | 2/1993 | Cohen | 239/542 |
| 5,400,973 | 3/1995 | Cohen | 239/533.1 |
| 5,609,303 | 3/1997 | Cohen | 239/542 |
| 5,615,838 | 4/1997 | Eckstein et al. | 239/533.1 |
| 5,628,462 | 5/1997 | Miller | 239/542 |
| 5,634,594 | 6/1997 | Cohen | 239/542 |
| 5,636,797 | 6/1997 | Cohen | 239/542 |

*Primary Examiner*—Andres Kashnikow
*Assistant Examiner*—Lisa Ann Douglas
*Attorney, Agent, or Firm*—Benjamin J. Barish

[57] ABSTRACT

A regulated flow-restrictor device particularly useful as a drip irrigation emitter includes an elastomeric element constructed and supported such that it is non-uniformly deformable along its length in response to an increase in fluid pressure to effect a sequential closing of clearances in the flow-reducing passageway.

19 Claims, 5 Drawing Sheets

FIG. 4
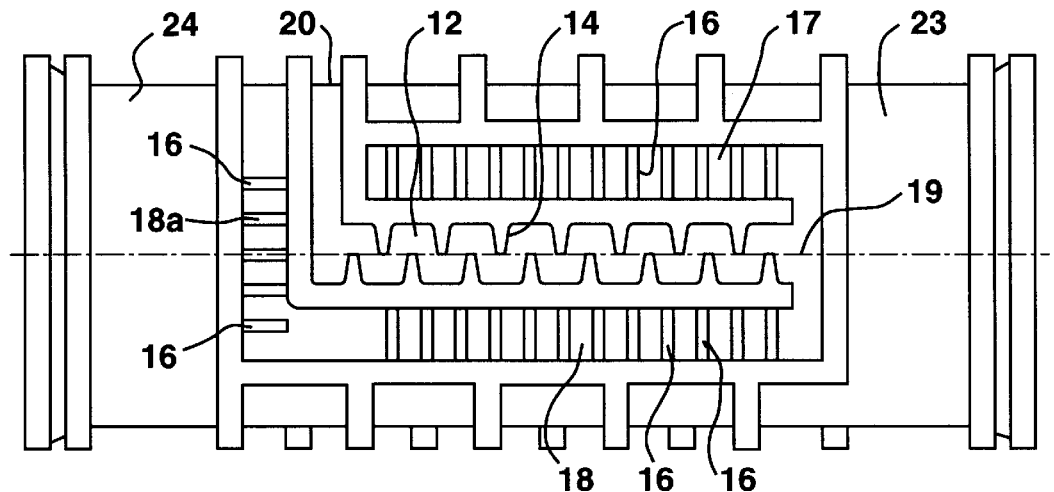
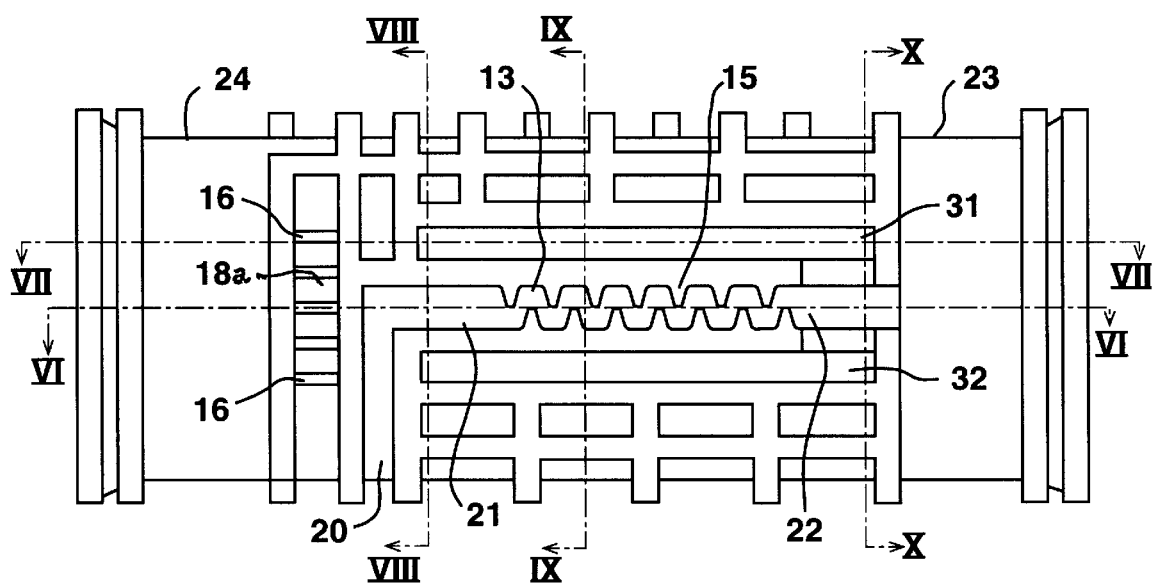
FIG. 5

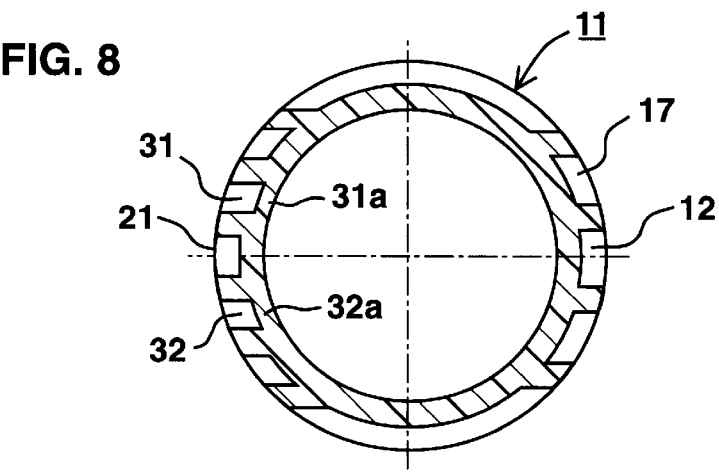
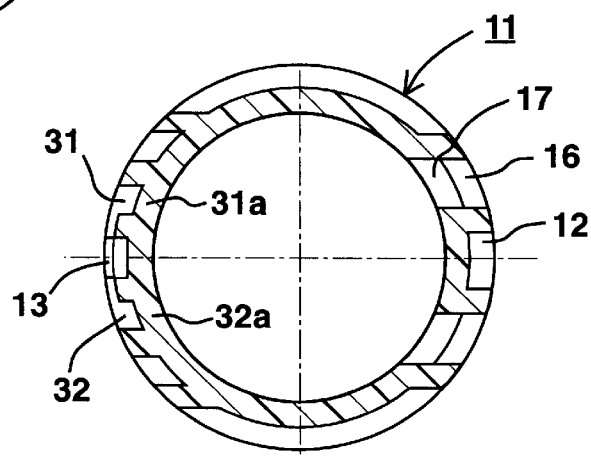
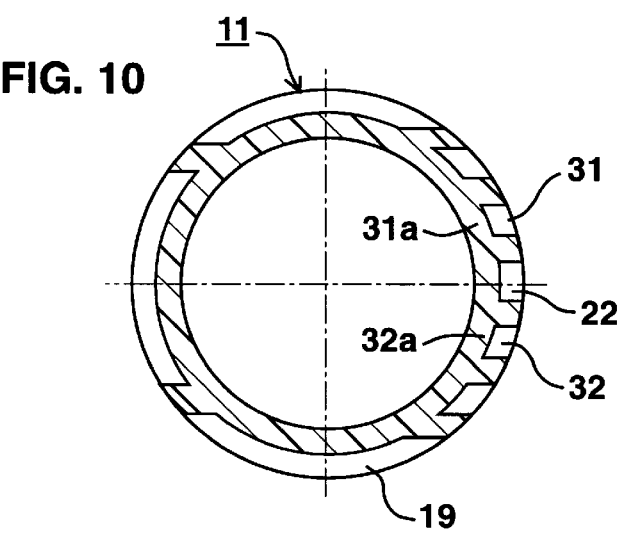
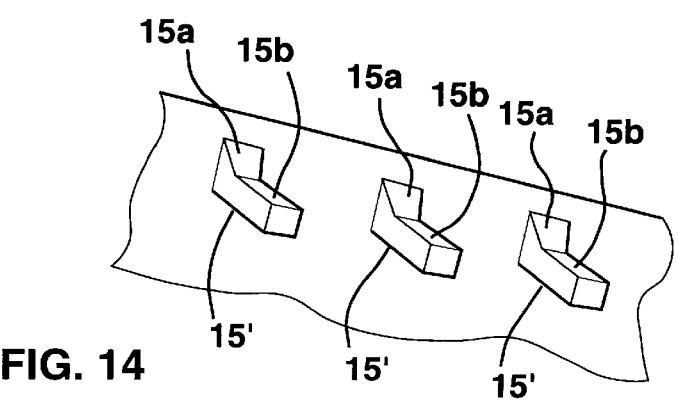

FIG. 11
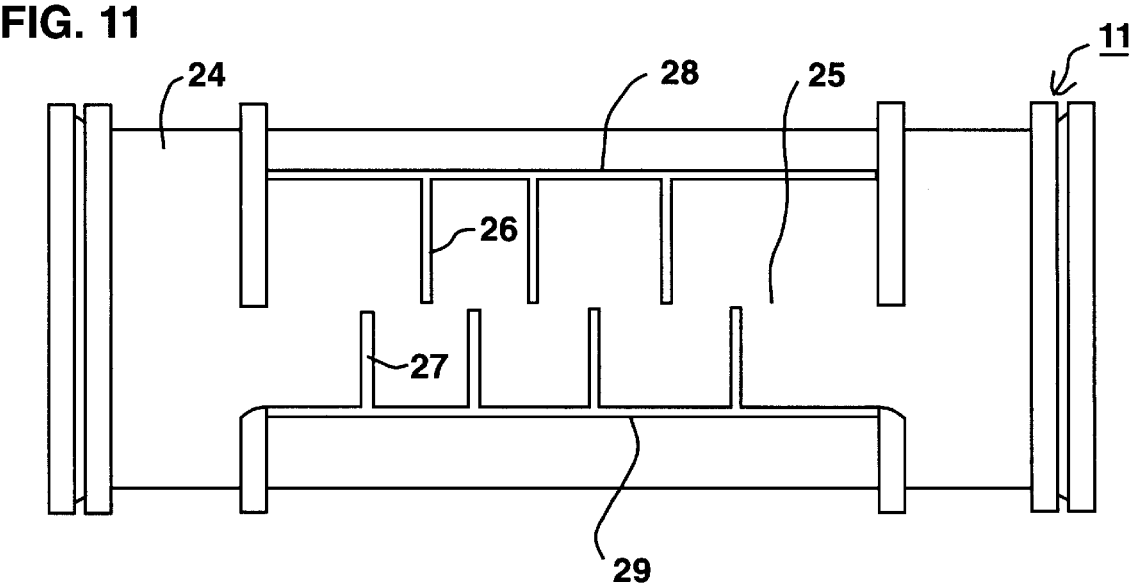
FIG. 12
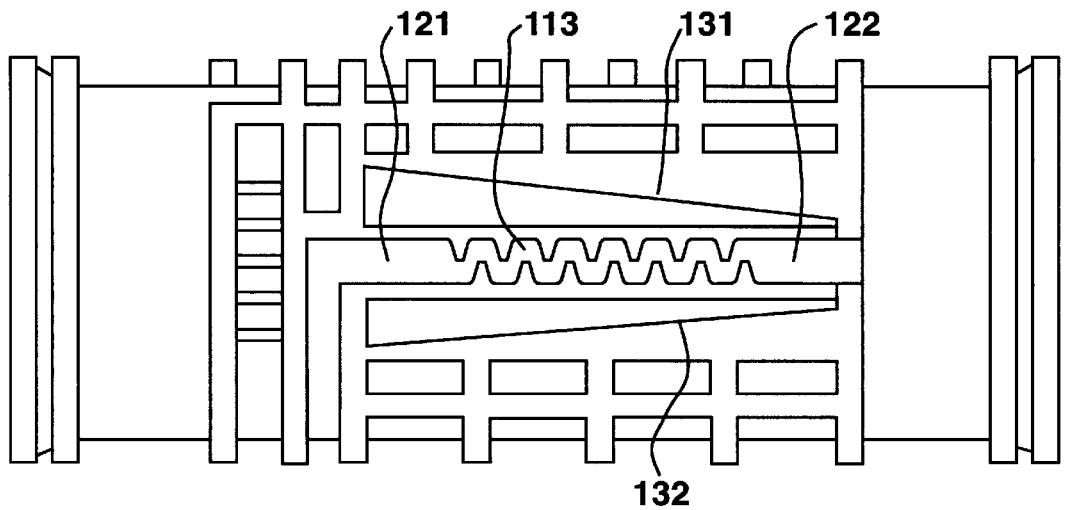
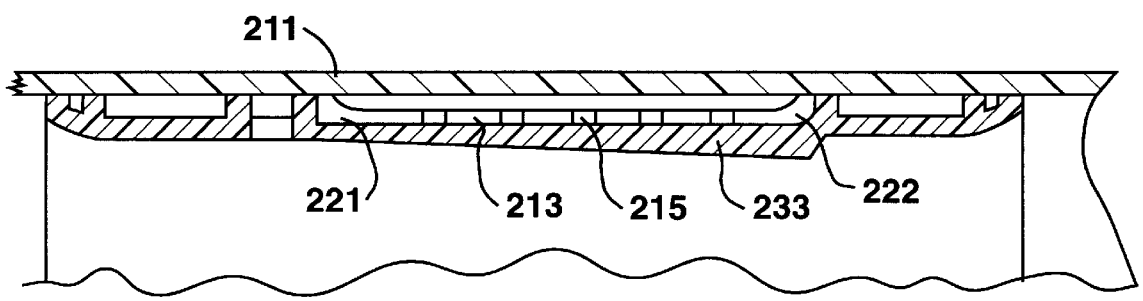
FIG. 13

REGULATED FLOW-RESTRICTOR DEVICES PARTICULARLY USEFUL IN DRIP IRRIGATION

FIELD AND BACKGROUND OF THE INVENTION

The present invention relates to regulated flow restrictor devices. The invention represents an improvement in the flow restrictor devices described in my prior U.S. Pat. No. 5,400,973, and is therefore described below with respect to such use.

My prior U.S. Pat. No. 5,400,973 describes a regulated flow-restrictor device particularly useful as a drip irrigation emitter, comprising a body member including a flow-regulating passageway having an inlet end to communicate with a source of pressurized fluid, and an outlet end for outletting the fluid; the flow-regulating passageway including a plurality of baffles and a deformable elastomeric element having a first face cooperable with the baffles and a second face exposed to a pressure varying with that of the fluid source, the baffles producing a flowpath having a series of bypass clearances which restrict the flow of the fluid through the passageway; the elastomeric element being deformable in response to fluid pressure on said second face to close the clearances sequentially in the direction from one of the passageway ends towards the other of the passageway ends with an increase in fluid pressure to maintain a substantially uniform flow to the outlet end of the passageway.

In the various examples of devices described in that patent, the sequential closing of clearances is effected by constructing the baffles in the flow-regulating passageway so that they define, with the elastomeric element of the flow-regulating passageway, clearances of increasing height which are sequentially closed by the deformation of the elastomeric element in response to an increase in the fluid pressure.

BRIEF SUMMARY OF THE PRESENT INVENTION

According to the present invention, elastomeric element is constructed and supported so as to be non-uniformly deformable along its length in response to and increased in the fluid pressure on its second face to effect the sequential closing of the clearances. That is, one end of the elastomeric element experiences a larger displacement than the opposite end for any particular pressure, such that with progressively increasing pressure, the membrane is progressively deformed along its length to effect the sequential closing of the clearances.

In the described preferred embodiments, the elastomeric element is non-uniformly deformable along its length according to the fluid pressure by the provision of a pair of recesses straddling the opposite sides of the baffles and defining yieldable webs interconnecting the elastomeric element with the remainder of the body member, which webs are of decreasing yieldability from the one passageway end to the other passageway end. In one described embodiment, this is done by providing webs of increasing thickness; in a second described embodiment, it is done by providing webs of decreasing width; and in a third described embodiment, it is done by providing webs of both increasing thickness and decreasing width. It will be appreciated, however, that other ways could be used for constructing and for supporting the elastomeric element to obtain this non-uniformity in its deformation, for example by constructing the elastomeric element itself of varying thickness along its length, or by supporting the elastomeric element at different spaced points along its length.

According to further preferred features in the described preferred embodiments, the cylindrical body member is made as a one-piece unit of elastomeric material and is integrally formed with the plurality of baffles on its outer face cooperable with the inner face of the tube when inserted therein to produce the fluid-regulating labyrinth of restrictor clearances. It will be appreciated, however, that the present invention could also be applied to flat and/or multiple-part constructions, such as those described in the above-cited U.S. Pat. No. 5,400,973.

Further features and advantages of the invention will be apparent from the description below.

BRIEF DESCRIPTION OF THE DRAWINGS

The invention is herein described, by way of example only, with reference to the accompanying drawings, wherein:

FIG. 4 is an elevational view illustrating one side of the body member in the device of FIGS. 1–3;

FIG. 5 is an elevational view of the opposite side of the body member;

FIGS. 6, 7, 8, 9 and 10 are sectional views along lines VI—VI, VII—VII, VIII—VIII, IX—IX and X—X, respectively, of FIG. 5;

FIG. 11 is an elevational view of the side of the body member rotated 90 degrees with respect to FIGS. 4 and 5;

FIG. 12 is an elevational view corresponding to that of FIG. 5 but illustrating another construction of the body member;

FIG. 13 is a fragmentary view illustrating a still further construction of the body member;

and FIG. 14 illustrates a modification in the construction of the baffles.

DESCRIPTION OF PREFERRED EMBODIMENTS

Figure 1:
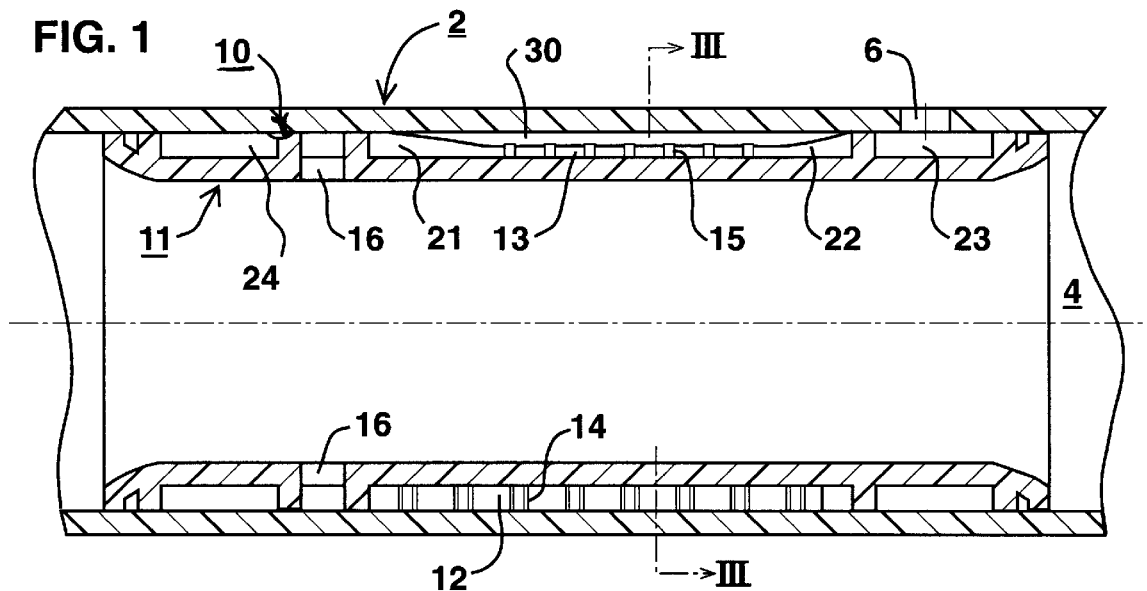
FIG. 1 is a longitudinal sectional view illustrating one form of regulated flow-restrictor device constructed in accordance with the present invention used as a drip irrigation emitter.
Figure 2:
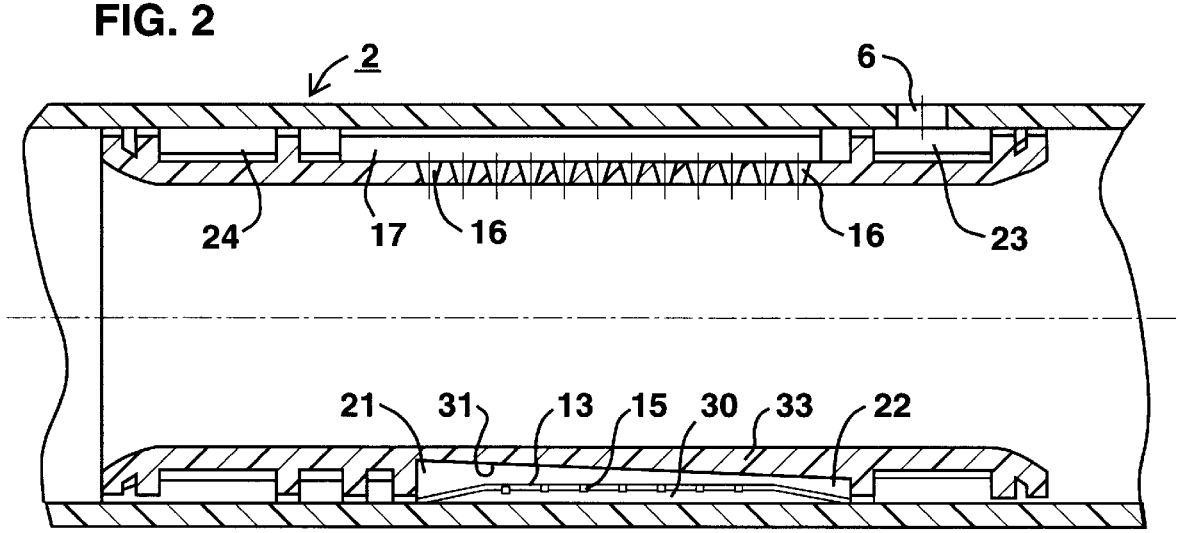
FIG. 2 is a similar view but rotated 90 degrees.
Figure 3:
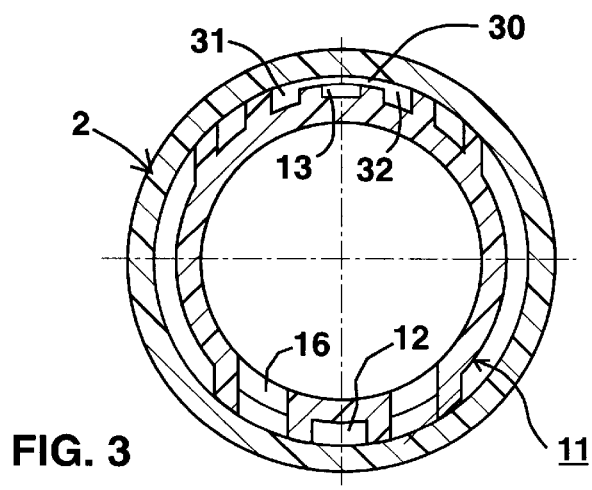
FIG. 3 is a transverse sectional view along line III—III of FIG. 1.
Figure 6:
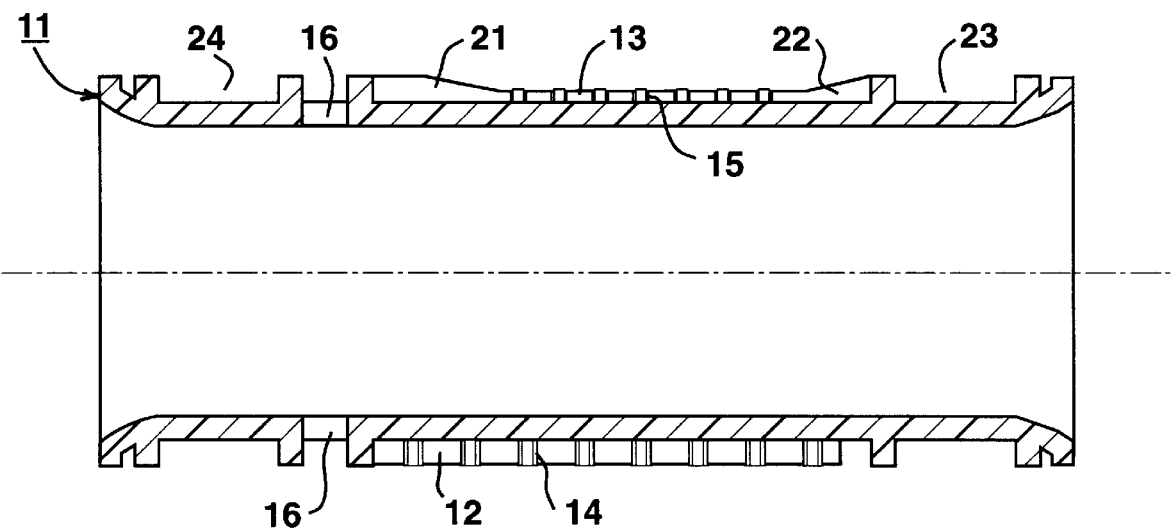

The drip-irrigation emitter illustrated in FIGS. 1–3 comprises a plastic tube 2 for conducting irrigation water under pressure and is formed with a plurality of openings 6 spaced along its length for discharging the water. A pressure-regulated, flow-restrictor device 10 is disposed within tube 2 for each of the discharge openings 6. Each flow-restrictor device 10 reduces the pressure of the water discharged from its opening 6 to substantially atmospheric pressure, and also regulates the flow through the discharge opening with variations in the pressure of the water within the tube.

Each pressure-regulated flow-restrictor device 10 is constituted of a one-piece body member 11 made of elastomeric material and of cylindrical configuration received within tube 2. The outer face of elastomeric body member 11 is formed on one side with a pressure-reducing passageway 12 (FIG. 4) to reduce the water pressure and flow rate through outlet opening 6, and on the opposite side with a flow-regulating passageway 13 (FIG. 5) to compensate the water flow through outlet opening 6 for variations in the water pressure.

Passageway 12 (FIG. 4) includes a plurality of baffles 14 which define, with the inner surface of tube 2, a labyrinth-type pressure-reducing passageway. Passageway 13 on the opposite side of body member 11 includes a plurality of baffles 15 which define, also with the inner surface of tube 2, a labyrinth-type flow-regulating passageway which varies in accordance with pressure to maintain a substantially uniform outlet rate despite variations in the water pressure within the tube 2.

The water enters from the interior 4 of tube 2 via a plurality of narrow slits 16 defining filter-type inlet openings leading into a pair of recesses 17, 18 (FIG. 4) straddling the pressure-reducer passageway 12. Recess 18 has a circumferential extension 18a and joins with recess 17 at the inlet end 19 of the pressure-reducer passageway 12. The outlet end of passageway 12 is in the form of another recess 20 which extends circumferentially to the opposite side of body member 11. Recess 20 leads to another recess 21 (FIG. 5) which constitutes the inlet end of the flow-regulating passageway 13. The outlet end of the latter passageway is also in the form of a recess 22 which leads to an annular recess 23 at one end of body member 11. The opposite end of body member 11 is formed with a similar annular recess 24 which communicates with annular recess 23 by a passageway 25.

As shown particularly in FIG. 11, passageway 25 is defined by two sets of spaced, parallel circumferential ribs 26, 27. Ribs 26 are connected at one end to an axial rib 28, and ribs 27 are connected at one end to another axial rib 29. Ribs 26 terminate short of axial rib 29, whereas ribs 27 terminate short of axial rib 28, to thereby provide passageway 25 connecting together the two annular recesses 23 and 24.

As indicated earlier, the flow-regulating passageway 13 regulates the flow from its inlet end 21 to its outlet end 22 in order to compensate for variations in the pressure of the water within the tube 2. This is done in basically the same manner as described in my above-cited U.S. Pat. 5,400,973, by sequentially closing clearances defined by the baffles 15 in the flow-regulating passageway 13 with the inner surface of tube 2. In the example illustrated in the drawings, these clearances, shown at 30 in FIGS. 1 and 3, are sequentially closed from the inlet end 21 toward the outlet end 22 of the flow-regulating passageway 13 in response to an increase in the pressure of the water within tube 2. It will be appreciated, however, that these clearances could be sequentially closed from the outlet end 22 towards the inlet end 21, as described in my above-cited U.S. Pat. 5,400,973.

In the specific devices described in my above-cited patent, the baffles are constructed to produce clearances of different heights which are sequentially closed in response to the pressure of the water. In the constructions illustrated in the present application, the strip of the elastomeric material in the flow-regulating passageway 13 is constructed and supported such that the elastomeric strip is non-uniformly deformable along its length in response to the fluid pressure whereby, with an increase in the fluid pressure, the elastomeric strip is progressively deformed along its length to effect the sequential closing of the clearances 30. Accordingly, baffles 15 may define clearances 30 which are of the same heights.

Figure 7:
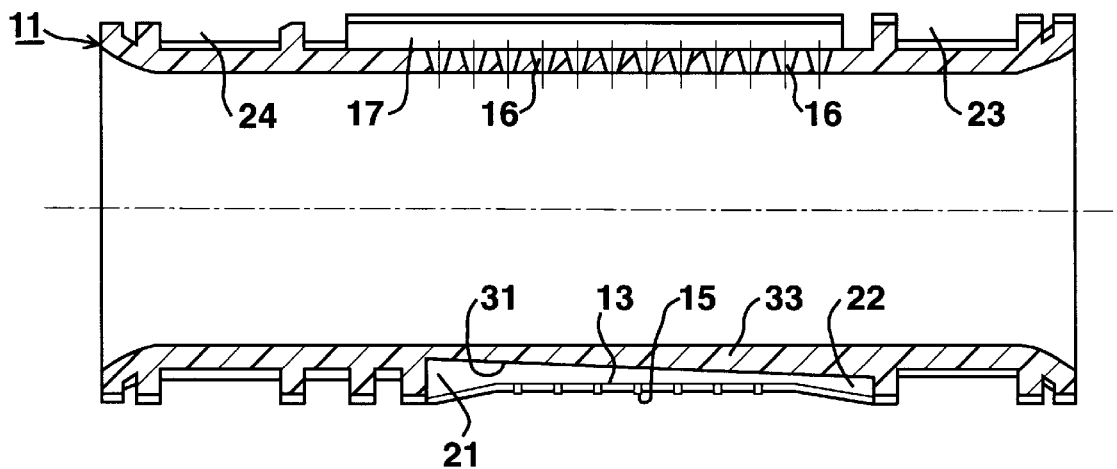

More particularly, the outer face of the elastomeric body member 11 is formed with a pair of spaced recesses 31, 32 (FIGS. 3 and 5) straddling baffles 15 within the flow-regulating passageway 13. Recesses 31, 32 define a strip containing those baffles and connected to the remainder of the cylindrical body member 11 by yieldable webs 31a, 32a, respectively, which permit the strip containing baffles 15 to deform or bend according to the fluid pressure. As shown in FIG. 7, recess 31 is of varying depth, as is recess 32 on the opposite side of the baffles 15, such that the webs 31a, 32a, connecting the strip containing the baffles 15 with the remainder of the body member 11, are of increasing thickness from the inlet end 21 of the flow-regulating passageway 13 to the outlet end 22 as shown in FIGS. 8–10.

It will thus be seen that when the water pressure within tube 2 is relatively low, this water pressure is applied to the inner surface of the strip of body member 11 defining the flow-regulating passageway 13, and will produce little deformation or deflection of this strip of the body member. Accordingly, there will be large clearances 30 between baffles 15 and the inner surface of tube 2 thereby minimizing the restriction of the flow of the water through the flow-regulating passageway 13.

As the pressure within tube 2 increases, this pressure is applied to the strip of body member 2 between the two recess 31, 32 and deflects the strip outwardly towards the inner surface of tube 2. This water pressure is applied equally over the complete surface of the strip defining the flow-regulating passageway 13. However, since webs 31a, 32a, defined by the recesses 31, 32 on opposite sides of this strip, are of increasing thickness from the inlet end 21 towards the outlet end 22 of the flow-regulating passageway 13 (as shown in FIG. 7), an increase in the pressure of the water within the tube will cause the strip first to deffect or bend outwardly adjacent to the inlet end 21 of passageway 13, to close the clearances 30 at that end. As the water pressure increases, this deflection of the strip between the two recesses 31, 32 will gradually progress along its length to close the clearances sequentially from the inlet end 21 of the flow-regulating passageway 13 towards the outlet end 22. Each closing of a clearance increases the restriction to flow, thereby regulating the outlet rate in response to pressure.

During operation of the emitter, water from the interior 4 of tube 2 passes through the filtering passageways 16 and enters the recesses 17 and 18 leading to the inlet 19 of pressure-reducer passageway 12 (FIG. 4). The baffles 14 within this passageway engage the inner surface of tube 2 and define a pressure-reducing labyrinth which substantially reduces the pressure of the water leaving passageway 12 via recess 20.

Recess 20 leads to the inlet end 21 (FIG. 5) of the flow-regulating passageway 13. This passageway regulates the flow rate by sequentially closing the clearances 30 of its labyrinth, defined by baffles 15 and the inner surface of tube 2, in response to variations in the pressure of the water within tube 2 as described earlier. The water exits from passageway 13 via its outlet end 22 into annular recess 23 at one end of body member 11, and into annular recess 24 at the opposite end of body member 11, via passageway 25 (FIG. 11) defined by the ribs 26–29.

The outlet openings 6 in tube 2 would be aligned with annular recess 23 and/or annular recess 24, so that the water, after passing through both the flow-reducing passageway 12 and the flow-regulating passageway 13, would be discharged at the slow regulated rate.

FIG. 12 illustrates another construction of the body member in the drip irrigation emitter of FIGS. 1–11. In this modification, the pair of recesses, therein shown as 131, 132 straddling the baffles 115 of the flow-regulating passageway 113 in the body member 111, are not of uniform width and of varying depth as in the construction described above with respect to FIGS. 1–11, but rather are of varying width and of uniform depth, the width decreasing from the inlet end of the flow-regulating passageway 113 towards the outlet end 122 of that passageway. In such a construction, the webs defined by these recesses permit a greater deflection of the strip of the elastomeric body member formed with the flow-regulating passageway 113 at the outlet end 122 of that passageway than at the inlet end 121. The effect is gradual progression of this deflection, and therefore a sequential closing of the clearances in passageway 113, from the inlet end 121 to the outlet end 122, with increasing water pressure.

FIG. 13 illustrates a variation in the construction of FIG. 12, wherein the recesses (corresponding to recesses 131 and 132 in FIG. 12) not only decrease in width, but also increase in depth, from the inlet end 221 to the outlet end 222, of the flow-regulating passageway 213. The webs 233 defined by these recesses are therefore of increased thickness from the inlet end 221 to the outlet end 222 of passageway 213 to contribute to the sequential closing of the clearances with increasing water pressure. In all other respects, the construction and operation of the drip irrigation emitter illustrated in FIG. 13 are substantially the same as described above with respect to FIGS. 12 and FIGS. 1–11.

In the previously-described constructions, the baffles 15 defining the clearances in the flow-regulating passageway are flat. FIG. 14 illustrates a modification, wherein these baffles 15' are inwardly tapered at their ends 15a defining the sides of the flow-regulating passageway, and are flat, as shown at 15b, in the mid portions of that passageway. Thus, when the elastomeric membrane sequentially closes the passageways, it fist engages the tapered portion 15a of each baffle and then engages the flat portion 15b.

While the invention has been described with respect to several preferred embodiments of a one-piece emitter unit construction, it will be appreciated that these are set forth merely for purposes of example. Thus, the features described above, particularly the deflection-deformation arrangements for sequentially closing the clearances in the flow-regulating passageway, could also be used in the various multi-piece constructions described in my U.S. Pat. 5,400,973. Many other variations, modifications and application of the invention will be apparent.

I claim:

1. A regulated flow-restrictor device particularly useful as a drip irrigation emitter, comprising:

a body member including a flow-regulating passageway having an inlet end to communicate with a source of pressurized fluid, and an outlet end for outletting the fluid;

said flow-regulating passageway including a plurality of baffles and a deformable elastomeric element having a first face cooperable with said baffles and a second face exposed to a pressure varying with that of the fluid source, said baffles producing a flowpath having a series of bypass clearances which control the flow of the fluid through said passageway;

said elastomeric element being deformable in response to fluid pressure on said second face to close said clearances sequentially in the direction from one towards the other of said passageway ends with an increase in fluid pressure to maintain a substantially uniform flow to said outlet end of the passageway;

characterized in that said elastomeric element is constructed and supported such that the elastomeric element is non-uniformly deformable along its length in response to an increase in fluid pressure on said second face to effect said sequential closing of the clearances.

2. The device according to claim 1, wherein said elastomeric element is non-uniformly deformable along its length according to said fluid pressure by the provision of a pair of recesses straddling the opposite sides of the baffles and defining yieldable webs interconnecting the elastomeric element with the remainder of the body member, which webs are of decreasing yieldability from said one passageway end to said other passageway end.

3. The device according to claim 2, wherein said webs are of increasing thickness from said one passageway end to said other passageway end.

4. The device according to claim 2, wherein said webs are of decreasing width from said one passageway end to said other passageway end.

5. The device according to claim 2, wherein said webs are of increasing thickness and decreasing width from said one passageway end to said ther passageway end.

6. The device according to claim 1, wherein the surfaces of said baffles defining said clearances are inwardly tapered at their ends defining the sides of said passageway.

7. The device according to claim 1, wherein said body member is of cylindrical configuration and is insertable into a tube supplying the pressurized fluid, said inlet end of the passageway communicating with the interior of said tube via a plurality of inlet holes through said cylindrical body member; said outlet end of the passageway communicating with a recess formed in the outer face of said cylindrical body member.

8. The device according to claim 7, wherein said cylindrical body member is made as a one-piece unit of elastomeric material and a strip thereof is integrally formed with said plurality of baffles on its outer face cooperable with the inner face of the tube when inserted therein to produce said fluid-regulating labyrinth of clearances.

9. The device according to claim 8, wherein said plurality of baffles are straddled by a pair of recesses formed in said strip which recesses permit the radial deformation of said strip progressively along its length in response to said fluid pressure applied to the inner face of the cylindrical body member.

10. The device according to claim 9, wherein said recesses define webs of increasing thickness from said one passageway end to said other passageway end.

11. The device according to claim 9, wherein said recesses define webs of decreasing width from said one passageway end to said other passageway end.

12. The device according to claim 1, wherein said clearances are sequentially closed in the direction from the inlet end of the flow-regulating passageway towards the outlet end of said latter passageway upon an increase in pressure in the fluid.

13. The combination of a tube for supplying pressurized fluid, and a plurality of flow-restrictor devices each according to claim 1, received within the tube and spaced along its length; said tube including an outlet opening for, and communicating with, the outlet passageway end of each of said flow restrictor devices.

14. A regulated flow-restrictor device particularly useful as a drip irrigation emitter, comprising:

a cylindrical body member of elastomeric material insertable into a tube supplying pressurized fluid;

said cylindrical body member being integrally formed on its outer face with a plurality of baffles cooperable with the inner face of the tube to produce a flow restrictor passageway having an inlet end, an outlet end, and a flowpath having a series of bypass clearances which control the fluid flow from said inlet and to said outlet end;

said cylindrical body member being further formed on its outer face with a pair of spaced recesses straddling the opposite sides of said baffles such as to define a strip containing said baffles and connected to the remainder of the cylindrical body member by yieldable webs which permit the strip to become deformed along its length, according to the fluid pressure, to close said clearances sequentially from one of said passageway ends towards the other of said passageway ends.

15. The device according to claim 14, wherein said recesses are of decreasing depth and of decreasing width to define yieldable webs of increasing thickness and decreasing width from said one passageway end towards said other passageway end.

16. The device according to claim 14, wherein said cylindrical body member is also integrally formed on its outer face with a pressure-reducer labyrinth upstream of said flow-regulating passageway to reduce the pressure at said latter passageway.

17. The device according to claim 14, wherein the outlet end of said flow-regulating passageway communicates with a pair of annular recesses formed on the outer face at the opposite ends of the cylindrical body member.

18. The device according to claim 14, wherein said recesses are of decreasing depth such that said yieldable webs are of increasing thickness from said one passageway end towards said other passageway end.

19. The device according to claim 14, wherein said recesses are of decreasing width such that said yieldable webs are of decreasing width from said one passageway end towards said other passageway end.

\* \* \* \* \*